July 31, 1956  R. B. BERANEK  2,757,027
HUB STRUCTURES
Filed March 14, 1951  3 Sheets-Sheet 1
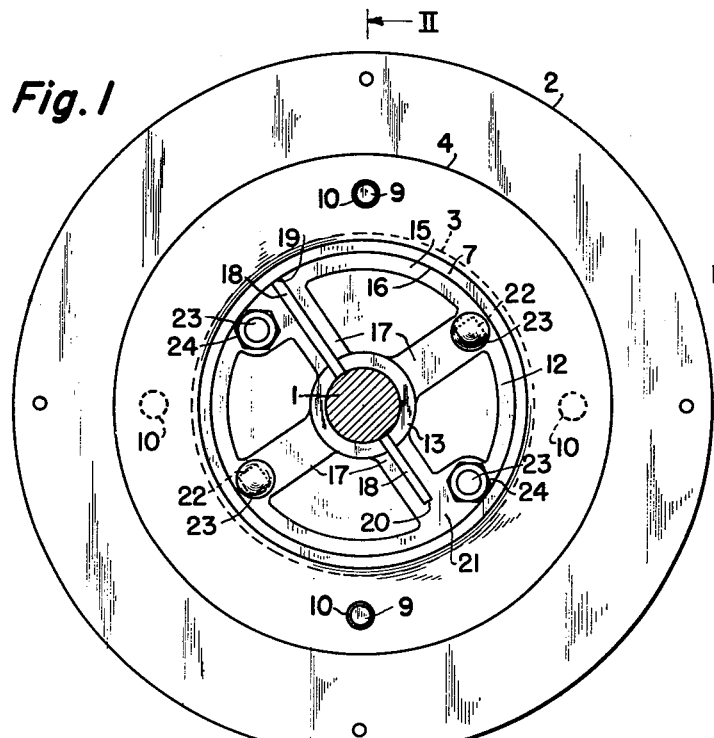
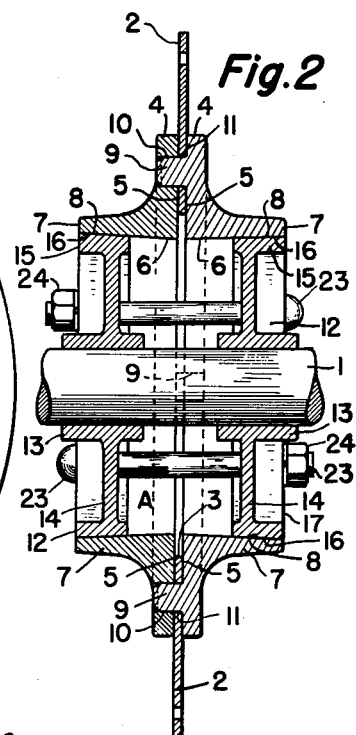
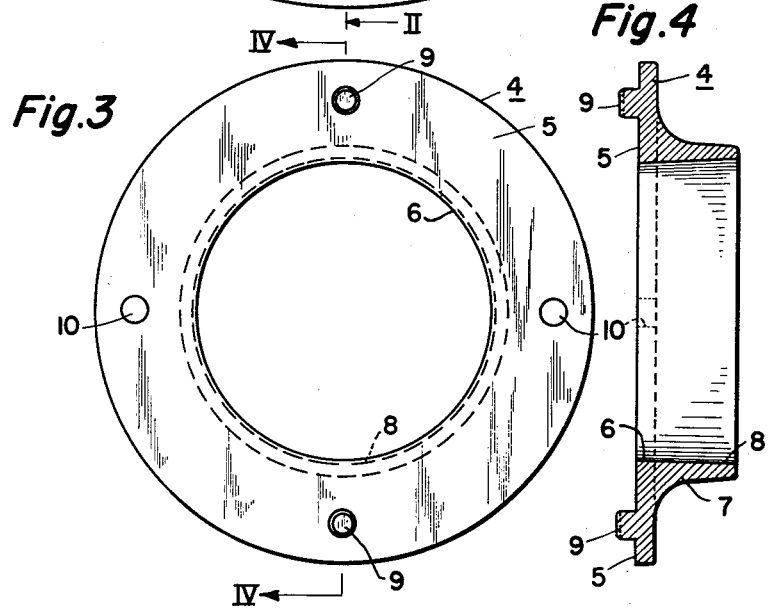
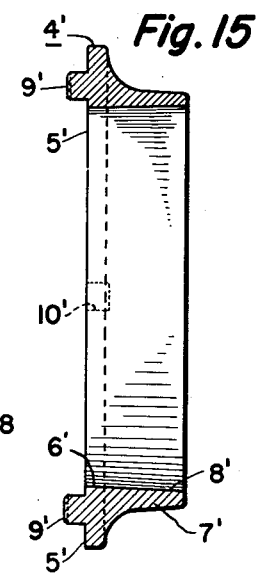
INVENTOR.
Rudolph B. Beranek
BY
Andrew K. Fulde
his attorney July 31, 1956  R. B. BERANEK  2,757,027
HUB STRUCTURES
Filed March 14, 1951  3 Sheets-Sheet 2
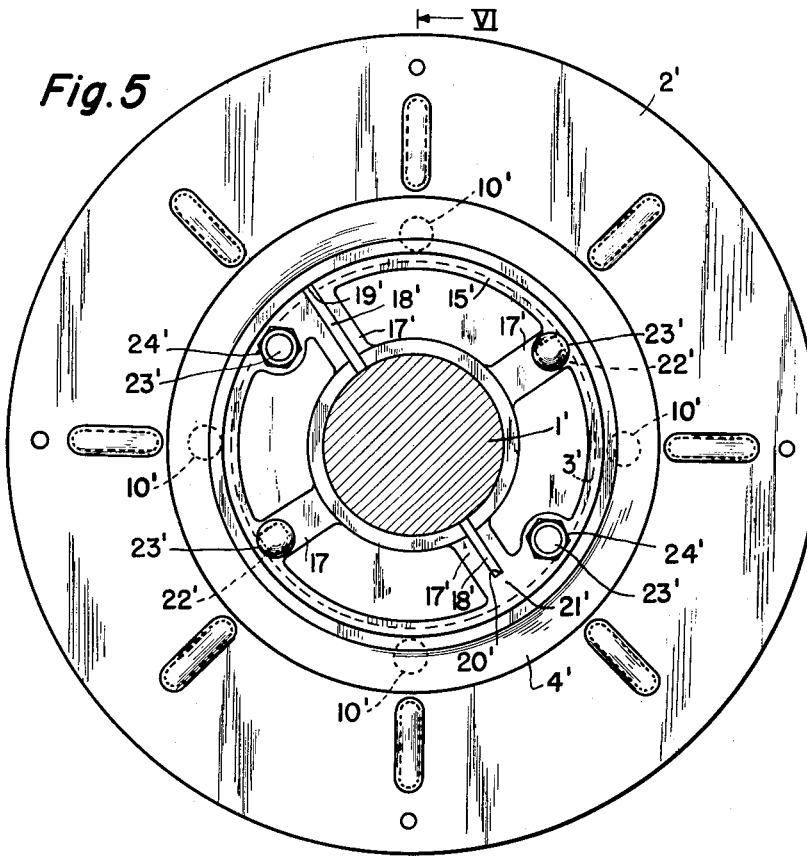
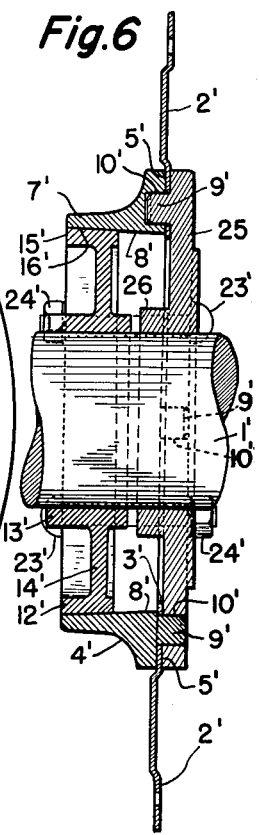
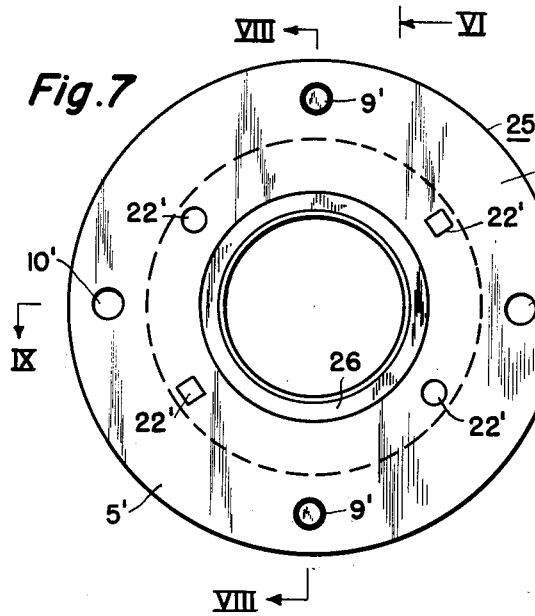
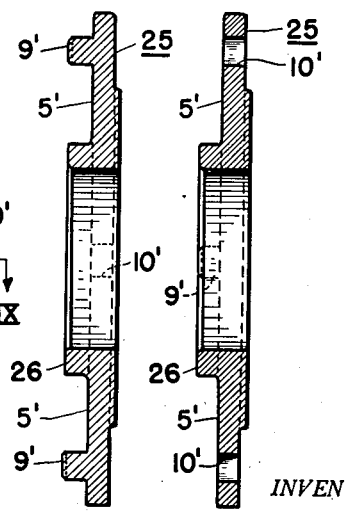
INVENTOR.
Rudolph B. Beranek
BY Andrew K. Foulds
his attorney July 31, 1956   R. B. BERANEK   2,757,027
HUB STRUCTURES
Filed March 14, 1951   3 Sheets-Sheet 3
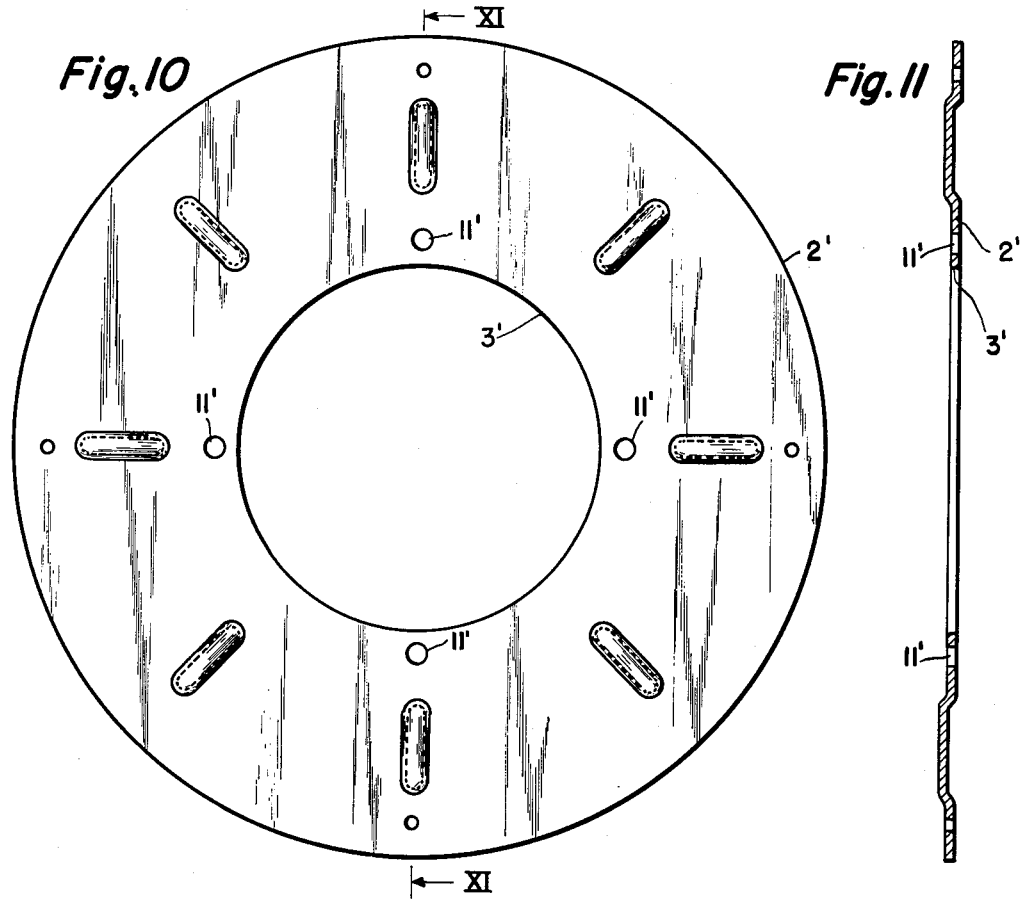
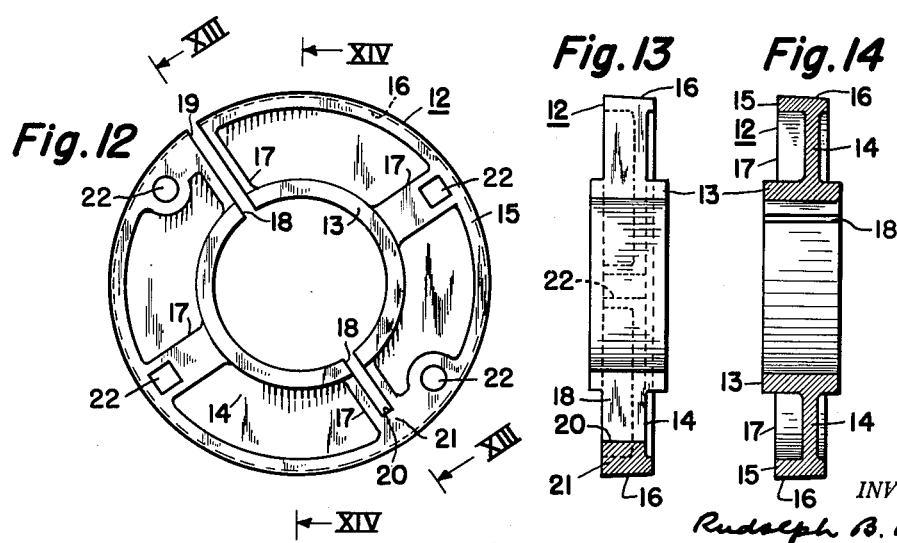
INVENTOR.
Rudolph B. Beranek
BY Andrew K. Fould
his attorney United States Patent Office  2,757,027
Patented July 31, 1956

2,757,027

HUB STRUCTURES

Rudolph B. Beranek, Columbus, Ohio, assignor to American Blower Corporation, Dearborn, Mich., a corporation of Delaware Application March 14, 1951, Serial No. 215,596

4 Claims. (Cl. 287—52.06)

My invention relates to new and useful improvements in hub structures, and particularly contemplates improved means for rigidly securing a structure or element to a rotary shaft so as to be fixed thereto and rotate therewith.

The invention will be found useful for connecting a disk or plate to a shaft so as to be located in a plane normal to the longitudinal axis thereof, which plate may in turn be connected to, or be part of, other structure to which rotation is to be imparted from the shaft.

One object of the invention is to provide an improved structure of the character mentioned which will be simple in construction and in which the various elements may be assembled readily in operative arrangement on a shaft, and which when assembled will assure a rigid connection between the shaft and the element or elements to be rotated thereby.

Another object is to provide a structure of the character mentioned which will be compact in volume, and rugged and rigid in use, and the parts of which are of such form or construction that they may if desired, be made of castings of light weight metal, for example of aluminum die castings, thereby reducing the weight of the structure without sacrifice of efficiency and strength.

The invention consists in the novel construction of parts and the arrangement and aggroupment thereof in operative combination to be more fully described hereinafter and the novelty of which will be particularly pointed out and distinctly claimed.

The invention is fully and clearly illustrated in the accompanying drawings forming part hereof and wherein—

Figure 1 is a view in front elevation of an embodiment of my invention.

Figure 2 is a section on the line II—II of Figure 1.

Figure 3 is a face view of a clamping ring forming an element of the construction shown in Figures 1 and 2.

Figure 4 is a section on the line IV—IV of Figure 3.

Figure 5 is a view in front elevation of another embodiment of my invention.

Figure 6 is a section on the line VI—VI of Figure 5.

Figure 7 is a face view of a clamping ring or cap-plate forming part of the construction shown in Figures 5 and 6.

Figures 8 and 9 are sections on the lines VIII—VIII and IX—IX of Figure 7, respectively.

Figure 10 is a face view of a plate member shown in Figures 5 and 6.

Figure 11 is a section on the line XI—XI of Figure 10.

Figure 12 is a face view of a wedging member forming part of the embodiments shown in Figures 1, 2, 5 and 6.

Figures 13 and 14 are sections on the lines XIII—XIII and XIV—XIV respectively of Figure 12.

Figure 15 is a sectional view of a clamping ring as employed in Figures 5 and 6.

Referring to the drawings by characters of reference and particularly to Figures 1 and 2, 1 designates a portion of a shaft, shown as being cylindrical in form, and adapted to be rotated by any suitable means, not shown. Surrounding the shaft 1 is a disk or plate-like member 2, which is to be secured to the shaft and having a central opening 3 through which the shaft 1 extends. The plate 2 is made of suitable metal, preferably sheet steel, of such gauge as to have the desired rigidity to be rotated and impart rotation to another part or parts (not shown) to which it may be connected, when the plate is connected to the shaft 1 by the means to be presently described. The plate is preferably circular and of such diameter as may be desired, the opening 3 also being circular and of such diameter that its edge is spaced from the shaft 1 as shown in Figure 1, for a purpose which will presently appear. This plate 2 is concentric with the shaft as is also the opening 3, and in the embodiment shown, is located in a plane normal to the longitudinal axis of the shaft.

On each side of the plate 2 is a clamping member 4, in the form of an annular plate or ring concentric with the shaft 1 and plate 2, and having on its inner side a radial contact or engaging area or face 5, which lies in a plane parallel to and frictionally engages the adjacent annular portion of the side face of the plate 2, as shown in Figure 2, and said ring having a central circular opening 6, which, as shown, is of a diameter somewhat less than the diameter of the opening 3 in the plate 2. The area of the contact face 5, is such as to provide sufficient clamping or gripping contact with the face of plate 2, to prevent slippage between said faces when the parts are assembled.

Each of said rings or plates 4 is provided on its outer side face, i. e., the face opposite to face 5, with an annular sleeve or flange 7, the inner face of which flange is conical, tapering inwards as at 8, toward the face 5 and the plate 2, the taper being coextensive with the circumferential inner face of the sleeve or flange.

The rings 4 are provided on their inner faces with projections preferably in the form of lugs or dowels 9 integral therewith and located at diametrically opposite points, and apertures 10 also at diametrical opposite points, the said diametrical lines on which the lugs or dowels and apertures are located being at right angles to each other, as shown in Figure 3. When the plates 2 and rings 4 are assembled on the shaft, the rings are so located that the lugs or dowels on one of the rings will project through holes 11 in plate 2, and be slidably seated in the apertures or seats 10 in the other ring, whereby the plate and rings are centered relative to each other and are interlocked so as to be held against rotative movement relative to each other.

The clamping members or rings 4 are clamped against the plate 2, and the plate and rings rigidly connected to the shaft 1, by means of wedging members 12, 12, slidably mounted on the shaft 1, and each inserted within one of said rings 4. Each of these wedging members consists of a hub member 13 mounted on and slidable lengthwise of the shaft 1, a web or disk portion 14 integral with the hub, and with a circular rim portion 15, the periphery of which is formed with a circumferential, inwardly inclined or conical face 16 adapted to engage with and fit into the conical face 8 on the ring.

Each wedging member 12 is formed with radial arms or spokes 17, shown as four in number, integral with and extending from the hub 13 to and integral with the rim 15, to add strength and rigidity to the member. The member 12 is made contractible by providing the same with a diametrical slot or "split" 18 which opens at one end as at 19, through the rim 15 and extends inwards and lengthwise and centrally through one of said spokes on one side of the hub, and continues through the opposite side of the hub and along the opposite spoke to a point short of the rim 15, as at 20, whereby a part 21 of the spoke is provided, serving to connect the two segments of the member formed by the slot or "split" 18. The part 21 acts as a fulcrum or hinge by virtue of which the two segmental parts of the member may be moved relative to each other.

The wedging members 12 are each provided with four bolt holes 22 arranged diametrically with respect to the member and adapted to receive headed square necked, clamping machine bolts 23 having nuts 24 threaded thereon by means of which bolts and nuts the wedging members are drawn toward each other when the parts are to be assembled, and to clamp and maintain the parts including the plate 2, in rigid relation to the shaft.

When the parts are to be assembled and connected to the shaft 1, the plate 2 and rings 4, are arranged in the relation shown in Figure 2 with the dowels in interlocking relation to the rings and the plate, and the wedging members 12, 12, located in the general position shown in said figure but non-contracted as shown in Figure 12, so that they will be sufficiently loose on the shaft to permit sliding movement thereon toward the rings 4. When the conical faces 16 on the wedging members 12 engage the cooperating conical faces 8 on the clamping rings, said rings will be moved toward each other and the plate 2, with the faces 5 in close contact with the plate 2. It will be understood that the wedging members are adjusted by rotation thereof until the bolt holes 22 in one of said members will aline with the corresponding bolt holts in the other member. It will be seen that the wedging members are of such thickness that when bolted together as hereinafter described the inner sides of the members are spaced from each other as shown in Figure 2 to form the space A. The bolts 23 may then be inserted through the alining holes 22 in the wedging members and the central hole 3 in plate 2 (see Figure 2) and the nuts 24 applied to the bolts and screwed up thereon to engage the outer faces of the wedging members and cause the conical faces 16 and 8 to coact to move the clamping rings into strong clamping engagement with the plate 2, and simultaneously by relative sliding movement between faces 16 and 8 to contract the wedging members until the hubs 13 are contracted to grip the shaft and lock the complete structure thereto. In the final location of the parts, the plate 2 will be held immovably between the clamping rings, the rings will in turn be fixed to the wedging members, and the latter fixed to the shaft, so that said plate will be fixed to the shaft to rotate therewith.

It will be seen that in the final relation of the parts when assembled, the interengagement of the dowels 9 on the clamping rings with the seats 10 in the rings, and the passage of the dowels through the apertures 11 in the plate 2, a positive driving connection is made between the plates and the rings in addition to the connection afforded by engagement of the faces 5 of the rings with the side faces of the plate.

It will be apparent that by the construction described the plate 2, will be rigidly held between the clamping rings without likelihood of bending or distortion in use, this being due to the provision of the dowels and to the large area of contact between the rings and the plate, it being noted the contact faces 5 on the rings are of such width radially of the plate as to cover a large annular area of the plate. It will also be seen that making rings 4 and plate 2 with the large central openings whereby the rings and plate are spaced from the shaft as at A, the plate and a pair of rings may be made standard within limits for assemblage with shafts of varying diameter.

Furthermore, the rings and the wedging members as described provide a construction which may be readily made of castings for example aluminum die castings, providing a compact structure of light weight and occupying small space, and at the same time having requisite strength and rigidity to resist the strains to which the structure may be subjected when being assembled, and in use.

The form of the invention shown in Figures 5 and 6 embodies features in common with the form shown in Figures 1 and 2, and will now be described using primed reference characters for the corresponding elements designated by the same unprimed characters used in the form shown in Figures 1 and 2 related figures: 1' designates the driven shaft, 2' the plate to be secured to the shaft and having a central opening 3'. In this form, a clamping ring 4' and wedging member 12' constructed and cooperating with the shaft and plate 2' in the same manner as heretofore described, are located on one side of the plate 2' only, see Figure 6. Instead of the ring and wedging member on the other side of the plate 2', I employ a clamping member in the form of a cap-plate 25, located in a plane normal to the shaft and which is preferably circular in form made of an aluminum die casting including a hub or sleeve 26 projecting through the opening 3' and receiving and slidable on the shaft 1' so as to be movable lengthwise of the shaft. This cap-plate 25 is concentric with the shaft 1' and plate 2', and is of sufficient diameter to overlap a substantial circular area of plate 2' surrounding the opening 3' to provide an engaging or contact face 5' to contact the plate 2'.

In this form, the plate 25 and ring 4' are provided respectively with lugs or dowels 9' and apertures 10', and the same plate 2' with apertures 11', which cooperate in the same manner as the lugs 9 and apertures or seats 10, 11, in the form shown in Figure 2, to hold the plate 2', ring 4' and plate 25 against rotative movement relative to each other.

When the parts are to be assembled they are arranged in the relation shown in Figure 6, and clamped rigidly together by four headed and square necked machine bolts 23' passed through apertures 22' in the wedging member 12', the cap-plate 25, and the central opening 3' in plate 2', said bolts bearing the clamping nuts 24' threaded thereon. The bolts when tightened sufficiently cause the wedge member, and the clamping plate to be moved toward the plate 2' to cause the same to be gripped between the ring 4' and the clamping plate 25, and finally to cause the wedge member and ring 4' to be locked together and the wedge member contracted to cause its hub 13' to grip the shaft 1', in the same manner and with the same effect described with reference to the form shown in Figures 1 and 2.

What I claim is:

1. A hub structure of the character described, comprising a shaft, a disk-like member to be secured to the shaft and having a central opening through which the shaft extends, a clamping member on each side of said disk-like member, each clamping member having an annular gripping face engaging the adjacent side face of the disk-like member, and each clamping member having a dowel seated in said disk-like member, one of said clamping members having an annular internal conical surface tapering inwards toward said disk-like member, the other of said clamping members having a hub mounted on and slidable lengthwise of the shaft, and having a supporting portion extending radially outward from said hub to said annular gripping face, a split, contractible wedging member having a hub mounted on and slidable lengthwise of the shaft, having a supporting portion extending radially outward from said hub, and having a conical rim carried by said supporting portion and tapered inwards toward said disk-like member and contacting the said internal conical surface, and clamping bolts extending through the supporting portions of said other clamping member and said wedging member and through said disk central opening for drawing said wedging member and said other clamping member toward each other to cause the clamping members to clamp said disk-like member, and the wedging member to be contracted to grip the shaft.

2. A hub structure of the character described, comprising a shaft, a disk-like member to be secured to the shaft and having a central opening through which the shaft extends, a clamping member on each side of said disk-like member, each clamping member having an annular gripping face engaging the adjacent side face of the disk-like member, and each clamping member having a dowel integral therewith and passing through an aperture in said disk-like member and seated in a seat in the opposite clamping member, one of said clamping members having an annular internal conical surface tapering inwards toward said disk-like member, the other of said clamping members having a hub mounted on and slidable lengthwise of the shaft, and having a supporting portion extending radially outward from said hub to said annular gripping face, a split, contractible wedging member having a hub mounted on and slidable lengthwise of the shaft, having a supporting portion extending radially outward from said hub, and having a conical rim carried by said supporting portion and tapered inwards toward said disk-like member and contacting the said internal conical surface, and clamping bolts extending through the supporting portions of said other clamping member and said wedging member and through said disk central opening for drawing said wedging member and said other clamping member toward each other to cause the clamping members to clamp said disk-like member, and the wedging member to be contracted to grip the shaft.

3. A hub structure of the character described, comprising a shaft, a disk-like member to be secured to the shaft and having a central, circular opening through which the shaft passes and concentric thereto, said disk-like member being in a plane normal to the axis of the shaft, a clamping ring on each side of said member and concentric therewith and with the shaft, each said ring having on one side an annular contact face engaging said member over an annular area surrounding the central opening in said member, said rings each having an annular flange on its opposite side from said contact face, said flange having an internal annular conical surface tapering inwards toward said member, a contractible, split wedging member in each of said clamping rings, each wedging member including a hub mounted on and slidable lengthwise of the shaft, a rim extending into said flange and having an external conical surface contacting the conical surface in said flange, said wedging member being split diametrically thereof, one end of said split extending and opening through the rim on one side of the axis of said wedging member, and through said hub and terminating at its other end adjacent but short of the rim on the other side of said axis, and clamping bolts extending through the wedging members and serving to move said members toward each other to thereby hold said rings in engagement with the disk-like member and to contract the hubs of the wedging members into gripping engagement with the shaft.

4. A hub structure of the character described, comprising a shaft, a disk-like member to be secured to the shaft and having a central, circular opening through which the shaft passes and concentric thereto, said disk-like member being in a plane normal to the axis of the shaft, a clamping ring on each side of said member and concentric therewith and with the shaft, each said ring having on one side an annular contact face engaging said member over an annular area surrounding the central opening in said member, said rings each having an annular flange on its opposite side from said contact face, said flange having an internal annular conical surface tapering inwards toward said member, a contractible, split wedging member in each of said clamping rings, each wedging member including a hub mounted on and slidable lengthwise of the shaft, a rim extending into said flange, spokes connecting said hub and rim, said rim extending into said flange and having an external conical surface contacting the conical surface in said flange, said wedging member being split diametrically thereof, said split at one end opening through the rim on one side of the axis of said wedging member and thence extending through a spoke and said hub, and along another spoke to a point adjacent but short of the rim on the other side of said axis and clamping bolts extending through the wedging members and serving to move said members toward each other to thereby hold said rings in engagement with the disk-like member and to contract the hubs of the wedging members into gripping engagement with the shaft.

References Cited in the file of this patent

UNITED STATES PATENTS

| | | |
|---|---|---|
| 123,413 | Newell | Feb. 6, 1872 |
| 165,546 | Cook | July 13, 1875 |
| 213,660 | James | Mar. 25, 1879 |
| 278,949 | Hartman | June 5, 1883 |
| 404,696 | Fee | June 4, 1889 |
| 827,346 | Bubb | July 31, 1906 |
| 907,300 | Sturtevant | Dec. 22, 1908 |
| 1,036,067 | Box | Aug. 20, 1912 |
| 1,107,607 | Hallowell | Aug. 18, 1914 |
| 1,392,363 | Shannon | Oct. 4, 1921 |
| 2,524,027 | Blackmarr | Oct. 3, 1950 |

FOREIGN PATENTS

| | | |
|---|---|---|
| 622,461 | Great Britain | of 1949 |